United States Patent
Kang

(10) Patent No.: US 12,013,008 B2
(45) Date of Patent: Jun. 18, 2024

(54) TORSION DAMPER FOR VEHICLE

(71) Applicant: Hyundai Transys Inc., Hwaseong-si (KR)

(72) Inventor: Hyo Eun Kang, Daegu (KR)

(73) Assignee: Hyundai Transys Inc., Seosan-si (KR)

( * ) Notice: Subject to any disclaimer, the term of this patent is extended or adjusted under 35 U.S.C. 154(b) by 735 days.

(21) Appl. No.: 17/116,533

(22) Filed: Dec. 9, 2020

(65) Prior Publication Data

US 2021/0215225 A1    Jul. 15, 2021

(30) Foreign Application Priority Data

Jan. 14, 2020   (KR) .................. 10-2020-0004770

(51) Int. Cl.
| | |
|---|---|
| *F16F 15/123* | (2006.01) |
| *B60K 1/00* | (2006.01) |
| *F16D 3/06* | (2006.01) |
| *F16D 3/12* | (2006.01) |

(52) U.S. Cl.
CPC .......... *F16F 15/12353* (2013.01); *B60K 1/00* (2013.01); *F16D 3/06* (2013.01); *F16D 3/12* (2013.01); *F16D 2300/22* (2013.01); *F16F 2230/0023* (2013.01); *F16F 2232/02* (2013.01); *F16F 2236/08* (2013.01)

(58) Field of Classification Search
CPC .......... F16F 3/12; F16F 3/06; F16F 15/12353; F16F 2236/08; F16F 2230/0023; F16F 2232/02; F16D 2300/22; B60K 1/00
See application file for complete search history.

(56) References Cited

U.S. PATENT DOCUMENTS

| 11,499,602 B2 * | 11/2022 | Güllük | ................ F16F 15/1207 |
| 2019/0226550 A1 * | 7/2019 | Weber | ............... F16F 15/12353 |
| 2020/0072333 A1 * | 3/2020 | Matsuda | ........... F16F 15/12373 |

(Continued)

FOREIGN PATENT DOCUMENTS

| CN | 110285188 A | 9/2019 |
| CN | 110546399 A | 12/2019 |

(Continued)

OTHER PUBLICATIONS

Office Action dated Apr. 24, 2022 in Chinese Application No. 202011469504.X.

(Continued)

*Primary Examiner* — Vishal R Sahni
(74) *Attorney, Agent, or Firm* — SALIWANCHIK, LLOYD & EISENSCHENK

(57) ABSTRACT

Provided is torsion damper for a vehicle including an output side-flywheel coupled to an output shaft of a driving unit in an axial direction, a first drive plate disposed to be relatively rotatable in an axial direction of the output side-flywheel, a second drive plate disposed to be relatively rotatable in an axial direction of the first drive plate, an input shaft of a transmission being coupled thereto in the axial direction, a first damper member installed between the output side-flywheel and the first drive plate and configured to absorb vibration and impact generated in a rotation direction thereof, and a second damper member installed between the first drive plate and the second drive plate and configured to absorb vibration and impact generated in a rotation direction thereof.

10 Claims, 4 Drawing Sheets

(56) References Cited

U.S. PATENT DOCUMENTS

| | | | |
|---|---|---|---|
| 2020/0208684 A1* | 7/2020 | Kang | F16D 3/12 |
| 2020/0256443 A1* | 8/2020 | Wu | F16F 15/12353 |
| 2020/0393018 A1* | 12/2020 | Watanabe | F16H 61/148 |
| 2021/0215225 A1* | 7/2021 | Kang | B60K 1/00 |
| 2022/0196079 A1* | 6/2022 | Sillmann | F16H 55/36 |

FOREIGN PATENT DOCUMENTS

| | | | |
|---|---|---|---|
| DE | 10 2007 051 068 A1 | 5/2008 | |
| DE | 10 2015 203 106 A1 | 8/2016 | |
| DE | 102016217218 A1 | 3/2018 | |
| DE | 102017126460 A1 | 5/2018 | |
| JP | 2003-48438 A | 2/2003 | |
| JP | 4069777 B2 | 4/2008 | |
| JP | 2012-219999 A | 11/2012 | |
| JP | 2019-157965 A | 9/2019 | |
| KR | 1997-0700294 A | 1/1997 | |
| KR | 10-2013-0072899 A | 7/2013 | |
| WO | WO-96/14521 A1 | 5/1996 | |
| WO | WO-2018/219395 A1 | 12/2018 | |
| WO | WO-2018219395 A1 * | 12/2018 | F16F 15/1203 |

OTHER PUBLICATIONS

Office Action dated Feb. 22, 2021 in Korean Application No. 10-2020-0004770.
Office Action dated May 16, 2022 in German Application No. 102020133352.8.

* cited by examiner

TORSION DAMPER FOR VEHICLE

CROSS-REFERENCE TO RELATED APPLICATION

This application claims priority from and the benefit of Korean Patent Application No. 10-2020-0004770, filed on Jan. 14, 2020, which is hereby incorporated by reference for all purposes as if set forth herein.

BACKGROUND

Field

Exemplary embodiments of the present disclosure relate to a torsion damper for a vehicle, and more particularly, to a torsion damper for a vehicle, capable of reducing the full length of a transmission and increasing low stiffness against vibration and noise by adopting a multi-stage damping structure.

Discussion of the Background

In general, a torsion damper for a vehicle (also referred to as a dual mass flywheel) is installed between an engine and a transmission of a vehicle and serves to attenuate torsional vibration generated in the process of transmitting power.

Such a torsion damper for a vehicle is composed of a first mass rotatably connected to an output shaft of the vehicle engine, a second mass coupled to be relatively rotatable in the axial direction of the first mass, a coil spring coupled between the first mass and the second mass and configured to absorb vibration and impact generated in the rotation direction, and the like.

However, the torsion damper for a vehicle in the related art has difficulty in reducing the full length of the transmission because the center diameter Rm of the coil spring needs to be increased in order to enhance NVH (noise, vibration, harshness) performance or to achieve low stiffness. Therefore, there is a need for a torsion damper structure for a vehicle, capable of achieving low stiffness while reducing the volume thereof.

The background art of the present disclosure is disclosed in Korean Patent Application Laid-Open No. 10-1997-0700294 (Jan. 8, 1997) entitled "Torsional Damper, Particularly a Driven Plate Assembly for a Motor Vehicle Clutch".

SUMMARY

Various embodiments are directed to providing a torsion damper structure for a vehicle, in which drive plates and damper members are installed in multiple stages along an axial direction, so that it is possible to reduce a diameter on a rotation direction side, thereby reducing the full length of a transmission and enhancing NVH (noise, vibration, harshness) performance or achieving low stiffness through the multi-stage damping structure.

In an embodiment, a torsion damper for a vehicle includes: an output side-flywheel coupled to an output shaft of a driving unit in an axial direction; a first drive plate disposed to be relatively rotatable in an axial direction of the output side-flywheel; a second drive plate disposed to be relatively rotatable in an axial direction of the first drive plate, an input shaft of a transmission being coupled thereto in the axial direction; a first damper member installed between the output side-flywheel and the first drive plate and configured to absorb vibration and impact generated in a rotation direction thereof; and a second damper member installed between the first drive plate and the second drive plate and configured to absorb vibration and impact generated in a rotation direction thereof.

Furthermore, when the output side-flywheel rotates, the first drive plate may be rotated by a reaction force of the first damper member, and when the first drive plate rotates, the second drive plate may be rotated by a reaction force of the second damper member.

Furthermore, one or more first mounting grooves may be formed at an edge of the first drive plate along a rotation direction thereof, and the first damper member may be mounted in the first mounting groove and may use a coil spring that applies a compressive elastic force in the rotation direction of the output side-flywheel and the first drive plate.

Furthermore, one or more second mounting grooves may be formed at an edge of the second drive plate along a rotation direction thereof, and the second damper member may be mounted in the second mounting groove and may use a coil spring that applies a compressive elastic force in the rotation direction of the first drive plate and the second drive plate.

Furthermore, one or more of the first drive plate and the second drive plate may be connected in series in the axial direction.

Furthermore, a cylindrical spline hub, through which the input shaft of the transmission is coupled in the axial direction, may further be formed at a center of the second drive plate, and a center of the first drive plate may be rotatably coupled while surrounding a circumferential surface of the spline hub from the outside.

Furthermore, a stopper may further be provided between the output side-flywheel and the first drive plate so as to allow relative rotation only within a set section.

Furthermore, a stopper may further be provided between the first drive plate and the second drive plate so as to allow relative rotation only within a set section, and a motor may be disposed in a radius direction of the torsion damper for a vehicle.

Furthermore, the motor may include a stator fixedly installed and a rotator rotatably disposed inside the stator, and an installation space may be formed inside the rotator such that one or more of the first drive plate, the second drive plate, and the output side-flywheel are disposed therein.

Furthermore, the installation space may be opened to the output shaft, and the rotor may be coupled to the output side-flywheel and transfer a rotational force.

The present disclosure has the effect in that the drive plates and the damper members are installed in multiple stages along the axial direction, so that it is possible to reduce a diameter on a rotation direction side, thereby reducing the full length of the transmission and enhancing NVH (noise, vibration, harshness) performance or achieving low stiffness through the multi-stage damping structure.

DETAILED DESCRIPTION OF THE ILLUSTRATED EMBODIMENTS

Hereinafter, preferred embodiments in accordance with the present disclosure will be described in detail with reference to the accompanying drawings.

The advantages and features of the present disclosure and methods for achieving them will become apparent with reference to the following detailed description in conjunction with the accompanying drawings.

However, the present disclosure is not limited to embodiments described below and the present disclosure may be realized in various forms. The embodiments to be described below are nothing but the ones provided to make the present disclosure perfect and assist those skilled in the art to which the present disclosure pertains to completely understand the scope of the present disclosure. The present disclosure is defined only by the scope of the appended claims.

In the description of the present disclosure, when it is determined that related publicly-known technologies and the like may obscure the subject matter of the present disclosure, detailed descriptions thereof will be omitted.

Figure 1:
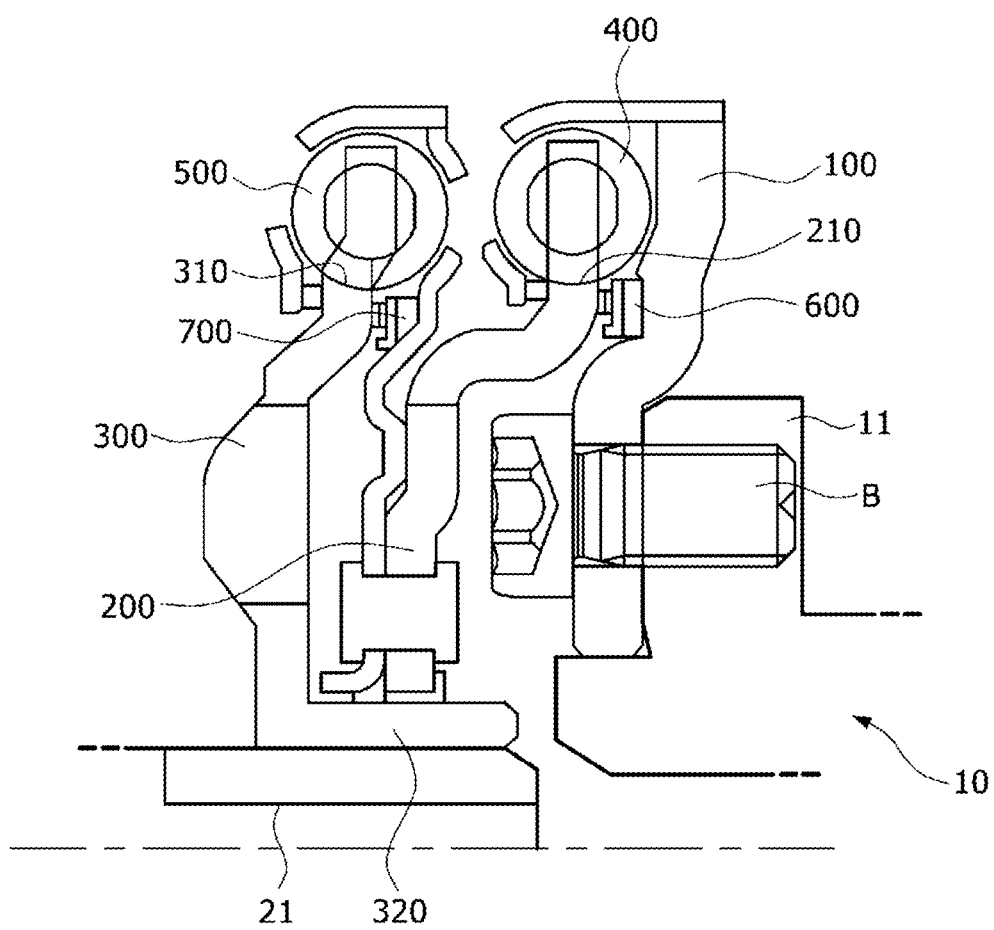
FIG. 1 is a side sectional view illustrating a torsion damper for a vehicle in accordance with the present disclosure.
Figure 2:
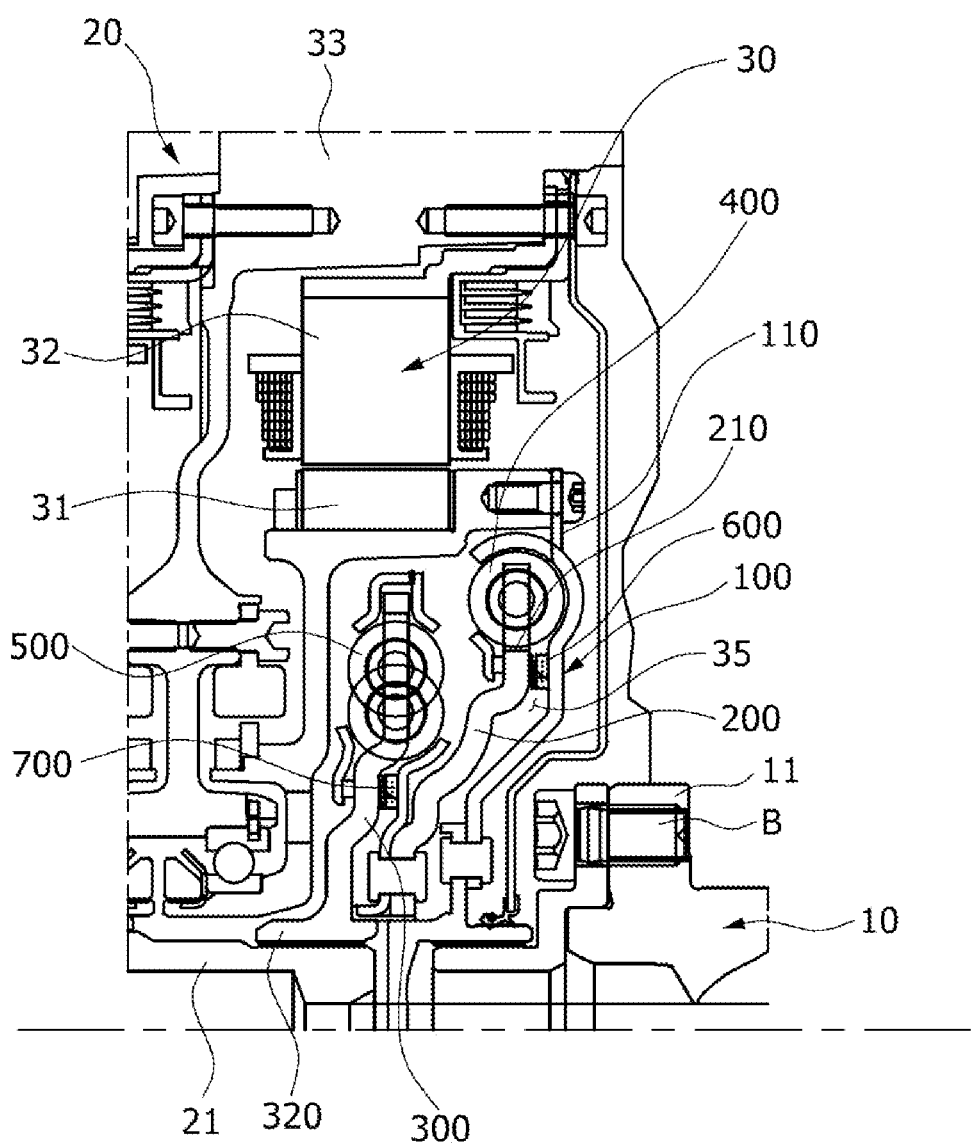
FIG. 2 is a side sectional view illustrating a state in which an output side-flywheel of the torsion damper for a vehicle in accordance with the present disclosure is coupled to a driving shaft of a motor.
Figure 3:
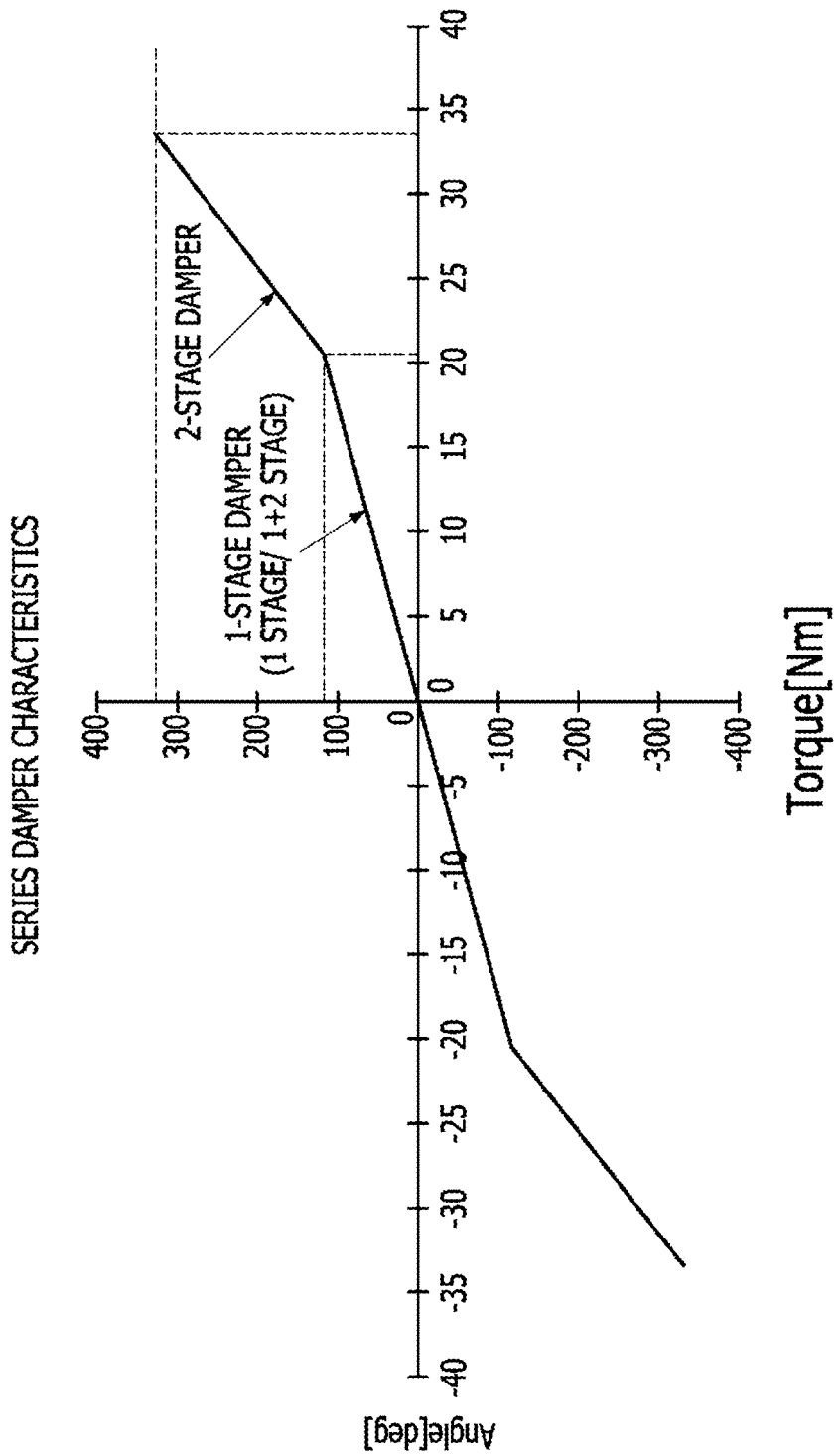
FIG. 3 is a graph illustrating two-stage damping characteristics of the torsion damper for a vehicle in accordance with the present disclosure.
Figure 4:
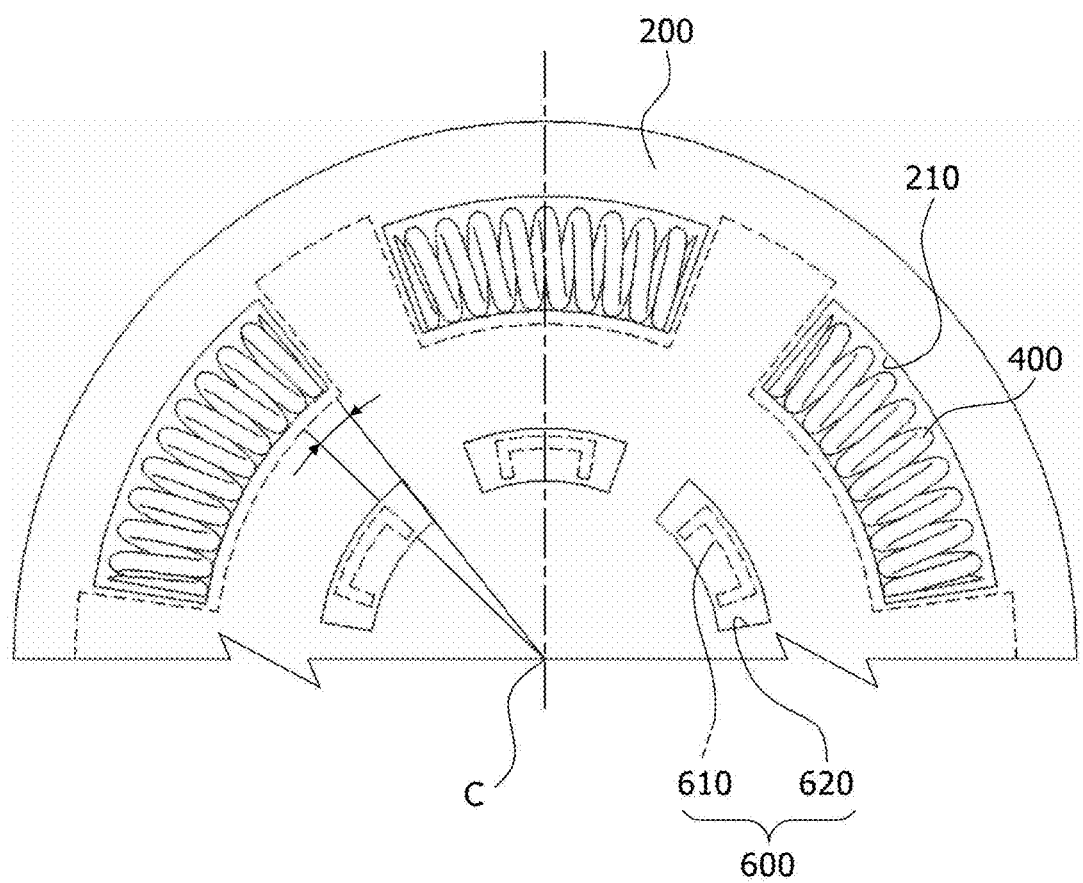
FIG. 4 is a view illustrating a stopper of the torsion damper for a vehicle in accordance with the present disclosure.

FIG. 1 is a side sectional view illustrating a torsion damper for a vehicle in accordance with the present disclosure, FIG. 2 is a side sectional view illustrating a state in which an output side-flywheel of the torsion damper for a vehicle in accordance with the present disclosure is coupled to a driving shaft of a motor, FIG. 3 is a graph illustrating two-stage damping characteristics of the torsion damper for a vehicle in accordance with the present disclosure, and FIG. 4 is a view illustrating a stopper of the torsion damper for a vehicle in accordance with the present disclosure.

As illustrated in FIG. 1 to FIG. 4, the torsion damper for a vehicle in accordance with the present disclosure includes an output side-flywheel 100, a first drive plate 200, a second drive plate 300, a first damper member 400, and a second damper member 500.

First, the output side-flywheel 100 may be coupled to an output shaft 11 of a driving unit 10 (an engine, a motor, and the like) in an axial direction, and an edge on the radial direction side may form the circumference thereof with respect to a rotation center C.

The output side-flywheel 100 may be integrally coupled to the output shaft 11 of the driving unit 10 by a fastening member B.

The first drive plate 200 may be disposed to be relatively rotatable in the axial direction of the output side-flywheel 100, and an edge on the radial direction side may form the circumference thereof with respect to the rotation center C.

Here, one or more first mounting grooves 210 may be formed at the edge of the first drive plate 200 along the rotation direction thereof, and may be arranged spaced apart from each other along a circumferential direction of the first drive plate 200.

The second drive plate 300 may be disposed to be relatively rotatable in an axial direction of the first drive plate 200, an edge on the radial direction side may form the circumference thereof with respect to the rotation center C, and an input shaft 21 of a transmission 20 is coupled to the second drive plate 300 in the axial direction.

Furthermore, one or more second mounting grooves 310 may be formed at the edge of the second drive plate 300 along the rotation direction thereof, and may be arranged spaced apart from each other along the circumferential direction of the second drive plate 300.

Furthermore, a cylindrical spline hub 320, through which the input shaft 21 of the transmission 20 is coupled in the axial direction, may be further formed at the center of the aforementioned second drive plate 300.

In addition, the center of the first drive plate 200 may be fixedly or rotatably coupled while surrounding the circumferential surface of the spline hub 320 from the outside.

Furthermore, the spline hub 320 may be formed on the inner circumferential surface thereof with a plurality of frictional protrusions (not illustrated) for applying a frictional force with the input shaft 21 of the transmission 20.

In addition, one or more of the first drive plate 200 and the second drive plate 300 may be connected in series in the axial direction of the input shaft 21, and the number of connections between the first drive plate 200 and the second drive plate 300 may be variously applied as needed.

The first damper member 400 is installed between the output side-flywheel 100 and the first drive plate 200 and absorbs vibration and impact generated in the rotation direction thereof.

Here, the first damper member 400 may be mounted in the first mounting groove 210 of the aforementioned first drive plate 200.

Furthermore, the first damper member 400 may have a coil spring shape that applies a compressive elastic force in the rotation direction of the output side-flywheel 100 and the first drive plate 200.

In such a case, the compressive elastic force may be applied by the first damper member 400 in the circumferential direction of the first drive plate 200.

That is, when the output side-flywheel 100 rotates, the aforementioned first drive plate 200 is rotated by the reaction force of the first damper member 400.

Furthermore, spring guides (not illustrated) may be installed at both ends of the first damper member 400, and the orientation of the first damper member 400 may be substantially maintained by the spring guides.

In addition, a plurality of drive lugs (not illustrated) may protrude in the axial direction of the aforementioned output side-flywheel 100, and the spring guides for supporting both ends of the first damper member 400 may be supported by the drive lugs of the output side-flywheel 100.

The drive lugs of the output side-flywheel 100 may be disposed at regular intervals along the circumferential direction thereof and support the spring guides, respectively, and the rotational force of the output side-flywheel 100 may be transferred to the spring guides through the drive lugs.

While compressed when the output side-flywheel 100 rotates, such a first damper member 400 absorbs vibration and impact generated in the rotation direction thereof.

At this time, the first drive plate 200 is rotated by the reaction force of the first damper member 400, and the rotational force transferred to the first drive plate 200 is transferred to the second damper member 500 to be described below.

Although the aforementioned rotational force transfer structure of the output side-flywheel 100 and the first damper member 400 is not illustrated, it may be variously applied as needed.

The second damper member 500 is installed between the first drive plate 200 and the second drive plate 300 and absorbs vibration and impact generated in the rotation direction thereof.

Here, the second damper member 500 may be mounted in the second mounting groove 310 of the aforementioned the second drive plate 300.

Furthermore, the second damper member 500 may have a coil spring shape that applies a compressive elastic force in the rotation direction of the first drive plate 200 and the second drive plate 300.

In such a case, the compressive elastic force may be applied by the second damper member 500 in the circumferential direction of the second drive plate 300.

That is, when the first drive plate 200 rotates in the circumferential direction, the second drive plate 300 is relatively rotated by the reaction force of the second damper member 500.

Furthermore, spring guides (not illustrated) may be installed at both ends of the second damper member 500, and the orientation of the second damper member 500 may be substantially maintained by the spring guides.

In addition, a plurality of protrusions (not illustrated) may protrude in the axial direction of the aforementioned first drive plate 200, and the spring guides for supporting both ends of the second damper member 500 may be supported by the protrusions of the first drive plate 200.

While compressed when the second drive plate 300 rotates, such a second damper member 500 absorbs vibration and impact generated in the rotation direction thereof.

At this time, the second drive plate 300 is rotated by the reaction force of the second damper member 500, and the rotational force transferred to the second drive plate 300 is transferred to the input shaft 21 of the transmission 20 through the spline hub 320.

The protrusions of the first drive plate 200 may be disposed at regular intervals along the circumferential direction thereof and supports the spring guides, respectively, and the rotational force of the first drive plate 200 may be transferred to the spring guides through the protrusions.

Although the aforementioned rotational force transfer structure of the first drive plate 200 and the second damper member 500 is not illustrated, it may be variously applied as needed.

As illustrated in FIG. 2, each component of a motor 30 may be disposed in the radial direction of the torsion damper for a vehicle, and the transmission 20 may be disposed in the axial direction of the motor 30 opposite to the driving unit 10.

The motor 30 may include a stator 31 fixedly installed along the radial direction of the torsion damper for a vehicle and a rotator 32 rotatably disposed inside the stator 31, and a case 33 may be provided outside the motor 30.

In such a case, an installation space 35 may be formed inside the rotator 32 such that one or more of the first drive plate 200, the second drive plate 300, and the output side-flywheel 100 are disposed therein, and may be opened in the direction of the output shaft 11.

For example, only the second drive plate 300 may be disposed in a state of being inserted into the installation space 35, only the first drive plate 200 and the second drive plate 300 may be disposed in a state of being inserted into the installation space 35, or all of the first drive plate 200, the second drive plate 300, and the output side-flywheel 100 may be disposed in a state of being inserted into the installation space 35.

Furthermore, a connection part 110 may protrude from the edge of the output side-flywheel 100, and may be integrally coupled to one end in the axial direction of the stator 31 by the fastening member B.

In addition, the stator 31 of the motor 30 may be disposed to surround an outer peripheral surface of the output side-flywheel 100, and the case 33 may be installed outside the motor 30. In such a case, the output side-flywheel 100, the first drive plate 200, and the second drive plate 300 may be disposed in an inner space of the case 33.

Meanwhile, a stopper 600 may be further provided between the output side-flywheel 100 and the first drive plate 200 so as to allow relative rotation only within a set section as illustrated in FIG. 4.

In such a case, the stopper 600 may include a locking protrusion 610 that protrudes from one surface in the axial direction of the output side-flywheel 100 and a locking groove 620 formed in one surface in the axial direction of the first drive plate 200.

The locking protrusion 610 is positioned in a state of being inserted into the locking groove 620, and when the output side-flywheel 100 rotates beyond the set section, the locking protrusion 610 is locked to one side of the locking groove 620.

At this time, the rotation of the first drive plate 200 is stopped by the locking operation of the locking protrusion 610, and only the second drive plate 300 becomes rotatable.

Although not illustrated in the drawings, a stopper 600 may be further provided between the first drive plate 200 and the second drive plate 300 so as to allow relative rotation only within a set section.

In such a case, the stopper 600 may include a locking protrusion 610 that protrudes from one surface in the axial direction of the first drive plate 200 and a locking groove 620 formed in one surface in the axial direction of the first drive plate 200.

The locking protrusion 610 is positioned in a state of being inserted into the locking groove 620, and when the first drive plate 200 rotates beyond the set section, the locking protrusion 610 is locked to one side of the locking groove 620.

At this time, since the rotation of the second drive plate 300 is stopped by the locking operation of the locking protrusion 610, the first drive plate 200 and the second drive plate 300 may be relatively rotated only within a predetermined rotation radius.

Accordingly, the torsion damper for a vehicle in accordance with the present disclosure provides the damping structure divided in multiple stages, so that it is possible to implement damping characteristics of two or more stages and low stiffness by increasing a mounting load.

A stopper 600 for supporting a corresponding surface of the first drive plate 200 may be further coupled to one surface in the axial direction of the output side-flywheel 100.

One end of the stopper 600 may be coupled to one surface in the axial direction of the output side-flywheel 100, and a support end thereof protruding in an opposite direction may support one surface in the axial direction of the first drive plate 200.

Here, the stopper 600 may be manufactured using an elastic body (rubber, synthetic resin, and the like), and one stopper 600 or a plurality of stoppers 600 may be arranged at regular intervals along the circumferential direction of the output side-flywheel 100.

In accordance with an embodiment of the present disclosure, the first and second drive plates 200 and 300 and the first and second damper members 400 and 500 are installed in multiple stages along the axial direction, so that it is possible to reduce a diameter on a rotation direction side, thereby reducing the full length of the transmission 20 and enhancing NVH (noise, vibration, harshness) performance or achieving low stiffness through the multi-stage damping structure.

Furthermore, the output side-flywheel 100, the first and second drive plates 200 and 300, and the first and second damper members 400 and 500 may be disposed within the installation space of the motor 30, so that it is possible to reduce the full length of the transmission 20.

Although detailed embodiments of the torsion damper for a vehicle in accordance with the present disclosure has been described, it is obvious that various modification can be made without departing from the scope of the present disclosure.

Accordingly, the scope of the present disclosure should not be limited to the aforementioned embodiments and should be defined by not only the claims to be described below but also those equivalents to the claims.

That is, it should be understood that the embodiments described above are illustrative in all respects, not limitative. The scope of the present disclosure is defined by the claims to be described below rather than the detailed description, and it should be construed that the meaning and scope of the claims and all changes or modified forms derived from the equivalent concept thereof are included in the scope of the present disclosure.

What is claimed is:

1. A torsion damper for a vehicle, comprising:
   an output side-flywheel coupled to an output shaft of a driving unit in an axial direction;
   a first drive plate rotatable with respect to an axial direction of the output side-flywheel;
   a second drive plate rotatable with respect to an axial direction of the first drive plate, an input shaft of a transmission being coupled thereto in the axial direction;
   a first damper member installed between the output side-flywheel and the first drive plate and configured to absorb vibration and impact generated in a rotation direction thereof;
   a second damper member installed between the first drive plate and the second drive plate and configured to absorb vibration and impact generated in a rotation direction thereof; and
   a stopper comprising a locking protrusion;
   wherein, when the output side-flywheel rotates, the first drive plate is rotated by a reaction force of the first damper member, and
   wherein the stopper is provided between the output side-flywheel and the first drive plate so as to allow relative rotation only within a set section.

2. The torsion damper for the vehicle according to claim 1,
   when the first drive plate rotates, the second drive plate is rotated by a reaction force of the second damper member.

3. The torsion damper for the vehicle according to claim 1, wherein one or more first mounting grooves are formed at an edge of the first drive plate along a rotation direction thereof, and
   the first damper member is mounted in the one or more first mounting grooves and is a coil spring that applies a compressive elastic force in the rotation direction of the output side-flywheel and the first drive plate.

4. The torsion damper for the vehicle according to claim 1, wherein one or more second mounting grooves are formed at an edge of the second drive plate along a rotation direction thereof, and
   the second damper member is mounted in the one or more second mounting grooves and is a coil spring that applies a compressive elastic force in the rotation direction of the first drive plate and the second drive plate.

5. The torsion damper for the vehicle according to claim 1, wherein the first drive plate and the second drive plate are connected in series in the axial direction.

6. The torsion damper for the vehicle according to claim 1, wherein a cylindrical spline hub, through which the input shaft of the transmission is coupled in the axial direction, is further formed at a center of the second drive plate, and
   a center of the first drive plate is rotatably coupled while surrounding a circumferential surface of the spline hub from outside.

7. The torsion damper for the vehicle according to claim 1, wherein a motor is disposed in a radius direction of the torsion damper for a vehicle.

8. The torsion damper for the vehicle according to claim 7, wherein the motor includes a stator fixedly installed and a rotator rotatably disposed inside the stator, and
   an installation space is formed inside the rotator such that one or more of the first drive plate, the second drive plate, and the output side-flywheel are disposed therein.

9. The torsion damper for the vehicle according to claim 8, wherein the installation space is opened to the output shaft.

10. The torsion damper for the vehicle according to claim 8, wherein a rotor is coupled to the output side-flywheel and transfers a rotational force.

* * * * *